Figure 1:
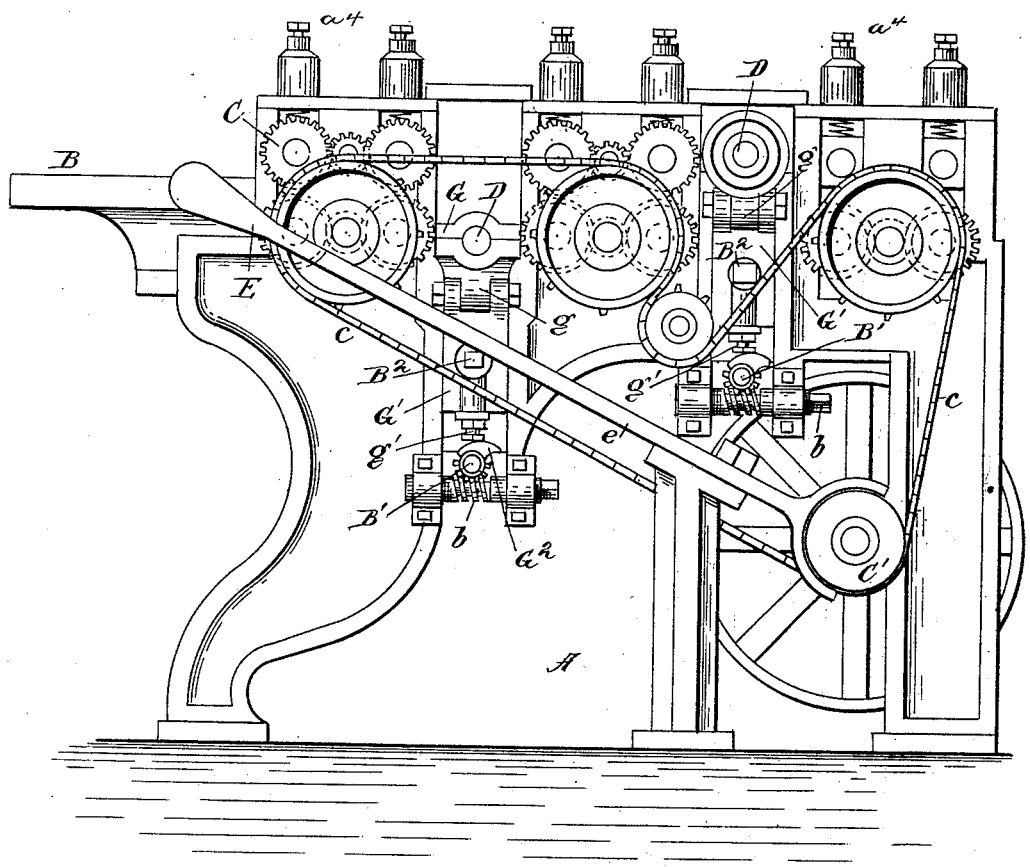

(No Model.)

J. J. PHILBRICK.
STAVE PLANER.

No. 360,616. Patented Apr. 5, 1887.

Witnesses
W. C. Coalies
P. E. Remmers

Inventor
Josiah J Philbrick
By Coburn & Thacher
Attorneys

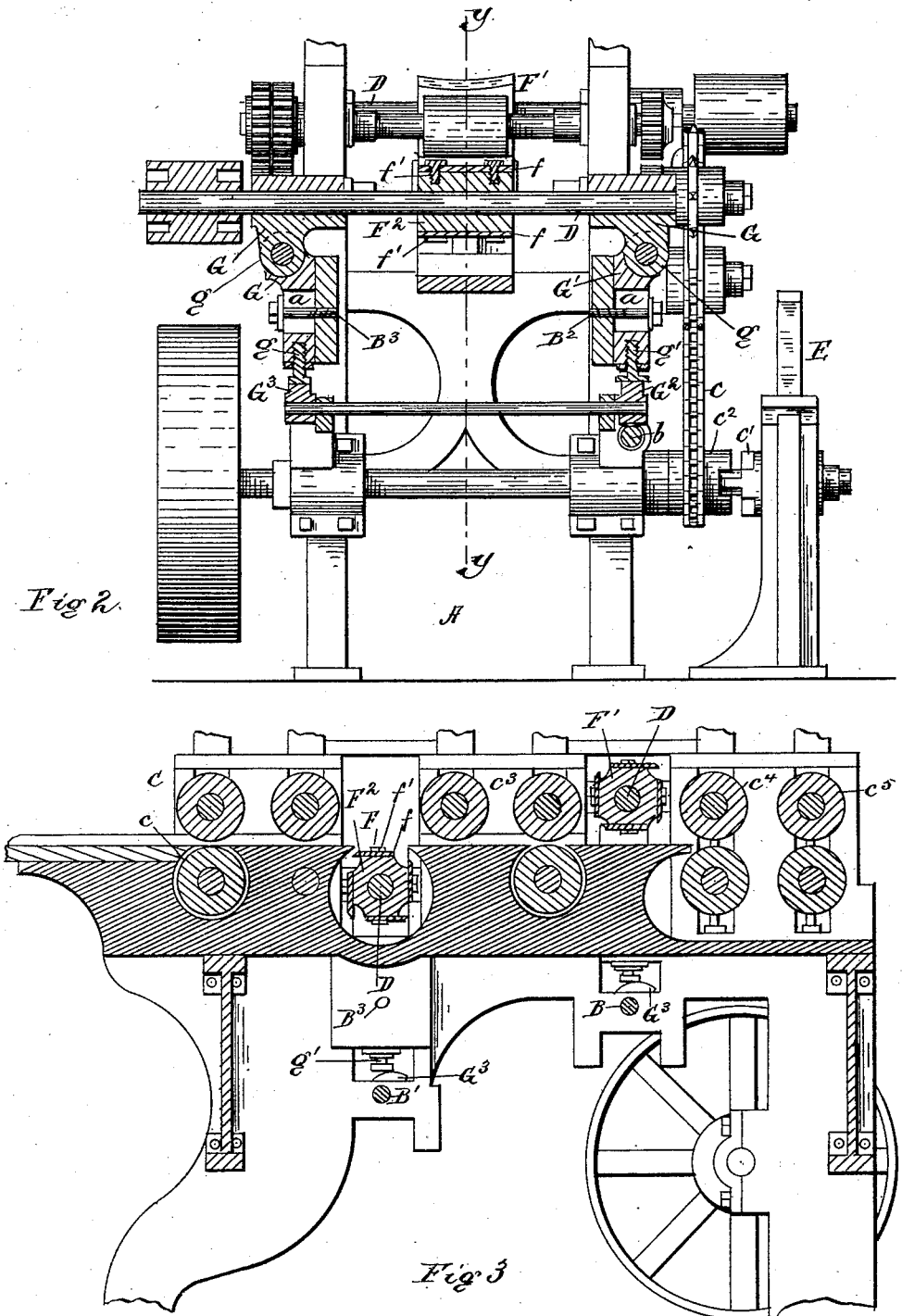

UNITED STATES PATENT OFFICE.

JOSIAH J. PHILBRICK, OF MOBILE, ALA., ASSIGNOR, BY MESNE ASSIGNMENTS, TO THE BLOUNT STAVE MACHINE COMPANY, OF CHICAGO, ILL.

STAVE-PLANER.

SPECIFICATION forming part of Letters Patent No. 360,616, dated April 5, 1887.

Application filed October 20, 1884. Serial No. 146,134. (No model.)

*To all whom it may concern:*

Be it known that I, JOSIAH J. PHILBRICK, a citizen of the United States, and residing at Mobile city, in the county of Mobile and State of Alabama, have invented a certain new and useful Improvement in Stave-Planers, which is fully set forth in the following specification, reference being had to the accompanying drawings, in which—

Figure 1 is a side elevation of a machine embodying my invention; Fig. 2, a transverse sectional view of the same on the line $x\,x$, Fig. 1; and Fig. 3, a central longitudinal sectional view of the same on the line $y\,y$ of Fig. 2.

My invention relates to machines for planing barrel-staves; and it consists in certain novel features, which I will now proceed to describe, and then specifically point out in the claim.

My machine is intended for use in connection with a crozing and chamfering machine and a jointing-machine for which I have made applications for Letters Patent, for the former by application No. 134,869, filed June 14, 1884, and for the latter by an application of even date herewith.

In the machine shown in the drawings the blank is introduced on the table B, and is immediately taken hold of by the first pair of feed-rollers C. These rollers are driven by means of pinions attached to the shafts on which the rollers are secured, and the endless chain-belt $c$, which engages with the sprocket-wheel $C^2$, which is set in motion by the lever E, the said lever being pivoted to the frame of the machine A at $e$, so that it is only necessary to swing the upper end of the lever laterally away from the machine to bring the sliding clutch $C'$, splined on the main driving-shaft, into engagement with the hub of the sprocket-wheel $C^2$, which is loose on said shaft. The sprocket-wheel then revolves with the main driving-shaft, and through the shaft-belt operates the whole system of feed-rollers.

The planers F F', which give to the upper and lower sides of the stave convex and concave surfaces, respectively, are both operated and adjusted in exactly the same way, the only difference between them being that the knife-edges are convex in one and concave in the other, one is placed below and the other above the stave, and that they revolve in reverse directions. The planer F, which cuts the under or concave side of the stave, is placed under the track of the stave and nearer to the front of the machine in advance of the planer F'.

I will now explain the devices for operating the planer F, and the same description will answer for the planer F'.

The knives $f$ are secured on the head $F^2$ by means of the clamp-screws $f'$, in the usual manner, and the head is secured on the shaft D, turning in bearings G. These bearings are pivoted by means of knuckle-joints $g$ to slides $G'$, vertically adjustable in suitable ways on the sides of the main frame-work. The slides may be secured at any point of their adjustment by means of clamp-screws $B^2\ B^3$, which pass through suitable slots, $a$, in the slides, as clearly shown in Fig. 2. The lower ends of these slides rest upon cams $G^2\ G^3$, secured on a shaft, $B'$, and rotated to simultaneously adjust both slides by means of a worm, $b$, journaled in the frame, as shown in Fig. 1. In order to permit an independent adjustment of each slide, screws $g'$ are inserted in the lower ends thereof, their heads resting upon cams $G^2\ G^3$. By turning either one of these screws the corresponding slide may be vertically adjusted, the knuckle-joint $g$ permitting this independent movement. By this device the cutter may be properly leveled up, and then, after such leveling, adjusted to its proper working position.

By rotating the planers in reverse directions, they being located on opposite sides of the path of the stave, they both cut against the feed motion, thereby producing an equal cut on both sides of the stave, and by locating one in advance of the other a stronger bearing is afforded for the staves against the action of the cutters. The blank, being carried along past the planers F F' by the feed-rollers $C^3\ C^4\ C^5$, is then fed into the second machine, where the stamping, crozing, and chamfering is done, and then into the third machine, where the jointing is done, thereby completing the stave.

Although I have described my stave-planing machine as intended for use in combination with the machines above mentioned, still it is evident that it may be used alone or with other machines for completing the stave.

It is obvious that many mechanical changes and alterations in the construction shown and described may be made without departing from the principle of my invention, and I therefore do not wish to be understood as limiting myself strictly to the precise details of construction shown and described.

Having thus described my invention, what I claim as new, and desire to secure by Letters Patent, is—

In a stave-planer, the combination, with the cutters, their shafts, and bearings, of the slides to which the bearings are hinged, having adjusting-screws at their lower extremities resting upon cams arranged to be operated simultaneously to raise or lower the cutters, substantially as and for the purposes specified.

JOSIAH J. PHILBRICK.

Witnesses:
E. L. CLARKSON,
H. P. BURRUSS.